J. T. UNDERWOOD.

BRICK KILN.

APPLICATION FILED APR. 3, 1916.

Reissued Jan. 16, 1917. 14,251.

Inventor

John T. Underwood,

By Toulmin & Toulmin

Attorneys

UNITED STATES PATENT OFFICE.

JOHN T. UNDERWOOD, OF DAYTON, OHIO, ASSIGNOR TO UNDERWOOD ENGINEERING COMPANY, OF DETROIT, MICHIGAN, A CORPORATION OF MICHIGAN.

BRICK-KILN.

14,251. Specification of Reissued Letters Patent. Reissued Jan. 16, 1917.

Original No. 1,105,724, dated August 4, 1914, Serial No. 808,059, filed December 22, 1913. Application for reissue filed April 3, 1916. Serial No. 88,748.

*To all whom it may concern:*

Be it known that I, JOHN T. UNDERWOOD, a citizen of the United States, and a resident of Dayton, in the county of Montgomery and State of Ohio, have invented a new and Improved Brick-Kiln, of which the following is a specification.

This invention relates to kilns for, and a process of, burning brick, tiles and other earthenware products, and its object is to provide a construction by means of which the articles within the kilns will be evenly and thoroughly burned at minimum cost.

It is also an object of the invention to provide a process in which the entire interior of the kiln is filled with fuel in an incandescent state under pressure, in excess of that of the air on the exterior of the kiln, so that the products within the kiln may be uniformly and completely treated.

The first part of this invention consists in the combination with a kiln, either permanent or built up of the articles to be burned, and of gas and air conduits having openings through which the fuel and air may pass into the kiln, the fuel and air both entering under pressure at all times, and being maintained within the kiln under pressure in excess of that of the air on the exterior of the kiln.

The second part of this invention consists of a process in which air (irrespective of its temperature) and gas are introduced under pressure into a kiln, or its equivalent, and the pressure of the fuel thus constituted is maintained in the kiln so that, upon combustion, the fuel will become incandescent, and the resulting high heat will be equally distributed to all parts of the interior of the kiln, whereby the material will be uniformly burned or treated, such pressure in the kiln being in excess of that of the air on the exterior of the kiln to exclude the ingress of outside or cold air. This results in a process in which the kiln is filled with fuel in an incandescent state under pressure. I deem myself to be the first to do this. The preferred gas is that known as producer gas, and in using it the invention further comprehends the novel feature of burning this gas in combination with cool, normal or unheated air, which is accomplished by means of the utilization of pressure applied to both this gas and air.

Figure 1:
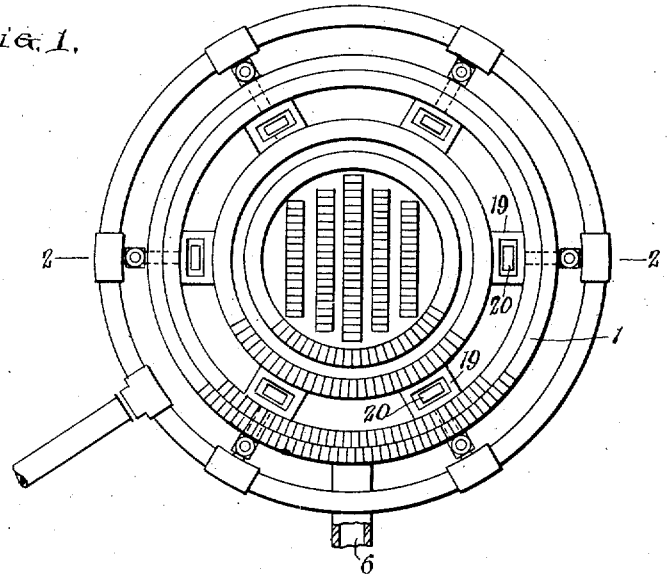
Figure 2:
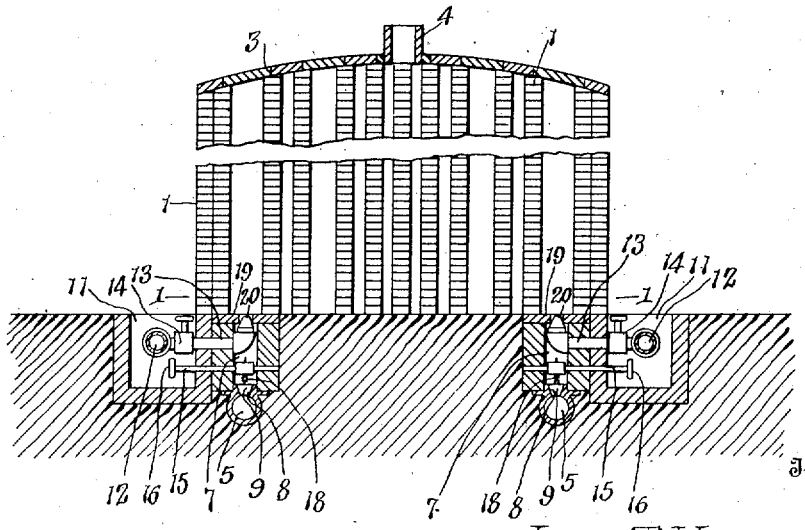

In the accompanying drawing Figure 1 is a horizontal section on the line 1—1 of Fig. 2. Fig. 2 is a vertical section on the line 2—2 of Fig. 1.

Similar reference characters refer to like parts throughout the several views.

In the ordinary brick kilns the burnt gases which carry the heat are caused to pass from the burners between the brick by means of the draft of a chimney or chimneys. The result is that there is less than atmospheric pressure within the kiln and that whenever a crack develops in the outer shell of the bricks which constitute the kiln, air rushes in through such cracks and chills the bricks adjacent such openings and prevents them from burning properly. In the present construction no reliance is placed upon the draft from chimneys, but both air and fuel gas are forced into the kiln under pressure so that the entire interior of the kiln is under pressure at all times in excess of that of the air on the exterior of the kiln. An escape flue is desirable for the exit of the burnt gases. Should any crack occur in the outer shell of the kiln, some of the heated gases within the kiln will escape, but no harm will be done thereby as the bricks adjacent to such an opening will be burned as hard as any others in the kiln.

The kiln shown in the accompanying drawing is merely conventional and of the bee-hive type. It is built up of cylindrical stacks 1 of brick which are separated by proper air spaces, the top of the kiln being closed by means of refractory slabs or bricks 3, and the top may be provided with a discharge flue 4. Extending around below the surface of the ground is shown a gas conduit 5 which may be supplied from the tunnel 6 with gas under pressure. At intervals burner chambers 7 are constructed above the conduit, below which are openings 8 in the top of the conduit 5, which openings may be closed by means of the mushroom valves 9. A pit 11 may be constructed to receive the air main 12, from which the air-pipes 13 extend into the burner chambers, each being provided with a valve 14 whereby the flow of air may be regulated.

Extending from the pit 11 into the burner chambers 7 are the rods 15 having handles 16 on their outer ends. Within the chambers 7 are chains 18 which wind on these rods 15 and connect to the mushroom valves 9 so that these valves can be raised to permit the flow of fuel gas under pressure into the chambers 7 and up through the openings into the kiln. Slabs 19 of refractory material will preferably be used to close the upper end of the burner chambers, which slabs may have openings 20 to permit the discharge of the air and gas into the kiln.

In my process of treating ceramic material, I introduce the gaseous fuel into the kiln under pressure. The fuel burns in the kiln interior.

The combustion of the fuel under pressure results in a very high heat due not only to the ordinary heat of combustion of the component elements of the fuel, but also due to the fact that the fuel is introduced and maintained in the kiln under pressure, thus increasing the temperature therein, the pressure in the kiln being in excess of that of the air on the exterior of the kiln.

It is to be observed that in my process I may employ producer gas, Dowson-gas, water-gas, or some such similar gas, or natural gas, in combination with air, both the air and the gas being introduced under pressure into the kiln and maintained therein under pressure in excess of the air pressure on the exterior of the kiln. I may employ air irrespective of its temperature. The use of air in its ordinary temperature, as found at the place of use, is a distinct advance in the art of utilizing producer gas as a fuel ingredient. Heretofore it has been accepted as impossible to successfully utilize cold air and producer gas together as a fuel; and it has been considered necessary to first heat the air. By my invention I overcome all the difficulties that have caused it to be deemed impossible or impracticable to burn producer gas in connection with unheated air.

The producer used for furnishing gas is of the well-known type known as steam-blown, water-sealed, although I do not mean to confine myself to any particular kind of gas or apparatus for producing it.

The temperature resulting from the union of the air and gas under pressure when ignited is very great, so that the fuel becomes incandescent throughout the entire kiln, spreading to the remotest portions of the kiln and properly heating all material within it to be treated. The fuel in this state of pressure and incandescence completely fills the interstices between the portions of the material, and will, if desired, raise to incandescence even the surface of the material so treated.

The spent gases are carried out through the flue 4. The rate of exit is lower than the rate of entrance of the gases, and, as a consequence, the pressure is maintained within the kiln above that of the surrounding atmosphere outside the kiln, a regulation being effected by the means or manner of supplying the gases.

In the practice of my process there is provided the means of regulating the supply of gas and air, and their proportion with respect to one another, so that the oxidizing or reducing character of the ignited fuel can be regulated at will. In the apparatus shown in the annexed drawings, the manipulation of the valves 13, controlling the air supply, and the valves 16 controlling the gas supply, gives this control. The hue or color of the material being treated can thus be determined with great accuracy and with extreme delicacy, the greater the quantity of air the lighter the hue or coloring, and the less the proportion of air, the darker the coloring. The desired hue or color is also produced with complete uniformity, due to the equal distribution of the ignited gases forced everywhere within the kiln by reason of the pressure and the consequent exclusion of any incoming cold drafts due to the pressure being greater within the kiln than outside of it.

The same hue of the material desired can be obtained uniformly throughout the kiln: formerly, there was no certainty that the hue desired would be obtained nor that the hue or color would be the same for all the material in any one baking. Further, a marked saving in time is effected by my invention. It will therefore be seen that air and gas under pressure enter the kiln and burn at the openings 20. The burnt gases will pass through the different openings left between the bricks in the kiln and finally escape through the discharge flue 4. The pressure within the kiln during the period of burning will always be above that of the atmosphere, and should any cracks occur, no cold air can enter because of this excess of interior pressure.

The sizes, proportions and details of the different parts of the burners, as well as the construction of the oven, may be modified by those skilled in the art without departing from the spirit of my invention set forth in the claims.

By the use of the word imperforate, I do not mean literally air-tight, because in practice, all kilns have vents for the exit of spent or burnt products of combustion, and peep holes and various cracks and fissures in the outer wall of the kiln due to imperfections of construction or settling or warping, consequent to use and operation, as well as a vent or flue for the exit of burnt or spent gases.

It is to be further observed that while this invention has been hereinbefore spoken of as relating to the treatment of ceramic material, it is capable of many other applications and uses, as, for instance, in the production of glass, the melting or reduction of metallic ores and in the manufacture of iron and steel.

Having thus fully described my invention, what I claim as new and desire to secure by Letters Patent, is:—

1. In a kiln having imperforate outer walls, the combination of a series of burner openings within the kiln at the floor level thereof, means for conducting air and gas to said openings under pressure where the gas may be burned, said kiln having means to permit the escape of the burnt gases, said exit means being so constricted as to maintain the pressure within the kiln in excess of that of the air on the exterior of the kiln.

2. In a kiln having imperforate outer walls, the combination of a gas conduit below the floor of the kiln, a series of burner chambers connecting to the conduit and having openings into the kiln, a valve in each chamber to control the flow of gas under pressure into the chamber, an air main, a pipe extending from said main into each burner chamber and adapted to discharge air under pressure into the chamber together with the gas, so that during the burning of the materials in the kiln, the pressure within the kiln shall be above that of the atmosphere.

3. The process of burning bricks which consists in arranging them in proper form in a kiln having imperforate outer walls, with air spaces so as to permit the passage of burnt gases between them, and with an outer coating to prevent the escape of the burnt gases except at proper flues, and then forcing air and gas into the bottom of the kiln under pressure where they may be burned, the pressure within the kiln being in excess of the air pressure on the exterior of the kiln and serving to prevent the entrance of atmospheric air through any openings in the outer coating.

4. In a kiln, means for introducing air and gas under pressure into the kiln and maintaining said air and gas, or a combination of them, under pressure in the kiln, in excess of that of the air on the exterior of the kiln, said kiln having means for permitting the escape of burnt gases.

5. The herein described process of treating ceramic material consisting in maintaining fuel in the interior of a kiln in an incandescent state under pressure in excess of that of the air on the exterior of the kiln.

6. The herein described process of treating ceramic material consisting in maintaining a fuel composed of air and gas in the interior of a kiln in an incandescent state under pressure in excess of that of the air on the exterior of the kiln.

7. The herein described process of treating ceramic material consisting in introducing air and gas under pressure into the interior of a kiln, and maintaining the resulting fuel in an incandescent state under pressure within the kiln in excess of that of the air on the exterior of the kiln.

8. The herein described process of treating ceramic material consisting of stacking such material within a kiln in a manner to leave suitable interstices for the entrance of heat; in introducing air and gas under pressure into such kiln; in maintaining the resulting fuel in an incandescent state under pressure within the kiln in excess of that of the air on the exterior of the kiln to cause the heat resulting from the combustion to treat the material with substantial uniformity throughout all parts of the kiln.

9. The herein described process of treating ceramic material consisting of stacking such material within a kiln in a manner to leave suitable interstices for the entrance of heat; in introducing air and gas under pressure into such kiln; in maintaining the resulting fuel in an incandescent state under pressure within the kiln in excess of that of the air on the exterior of the kiln in varying the proportions of the air and gas to vary the oxidation, and thereby control the resulting color of the material.

10. The herein described process of treating ceramic material consisting of stacking the material within a closed kiln in a manner to leave interstices for the entrance of heat; in introducing into such kiln air and gas under pressure; and in maintaining the resulting fuel in an incandescent state under pressure within the kiln in excess of that of the air on the exterior of the kiln.

In testimony whereof I have signed this specification in the presence of two subscribing witnesses.

JOHN T. UNDERWOOD.

Witnesses:
F. W. SCHAEFER,
H. L. HAMMAKER.